SAMPLED DATA SYSTEM

Filed Dec. 19, 1963

INVENTOR
RICHARD P. WITT
BY Donald Brown
ATTORNEY

United States Patent Office 3,305,854

Patented Feb. 21, 1967

3,305,854
SAMPLED DATA SYSTEM

Richard P. Witt, Framingham, Mass., assignor to Raytheon Company, Lexington, Mass., a corporation of Delaware Filed Dec. 19, 1963, Ser. No. 331,718
8 Claims. (Cl. 340—347)

Figures 1, 2:
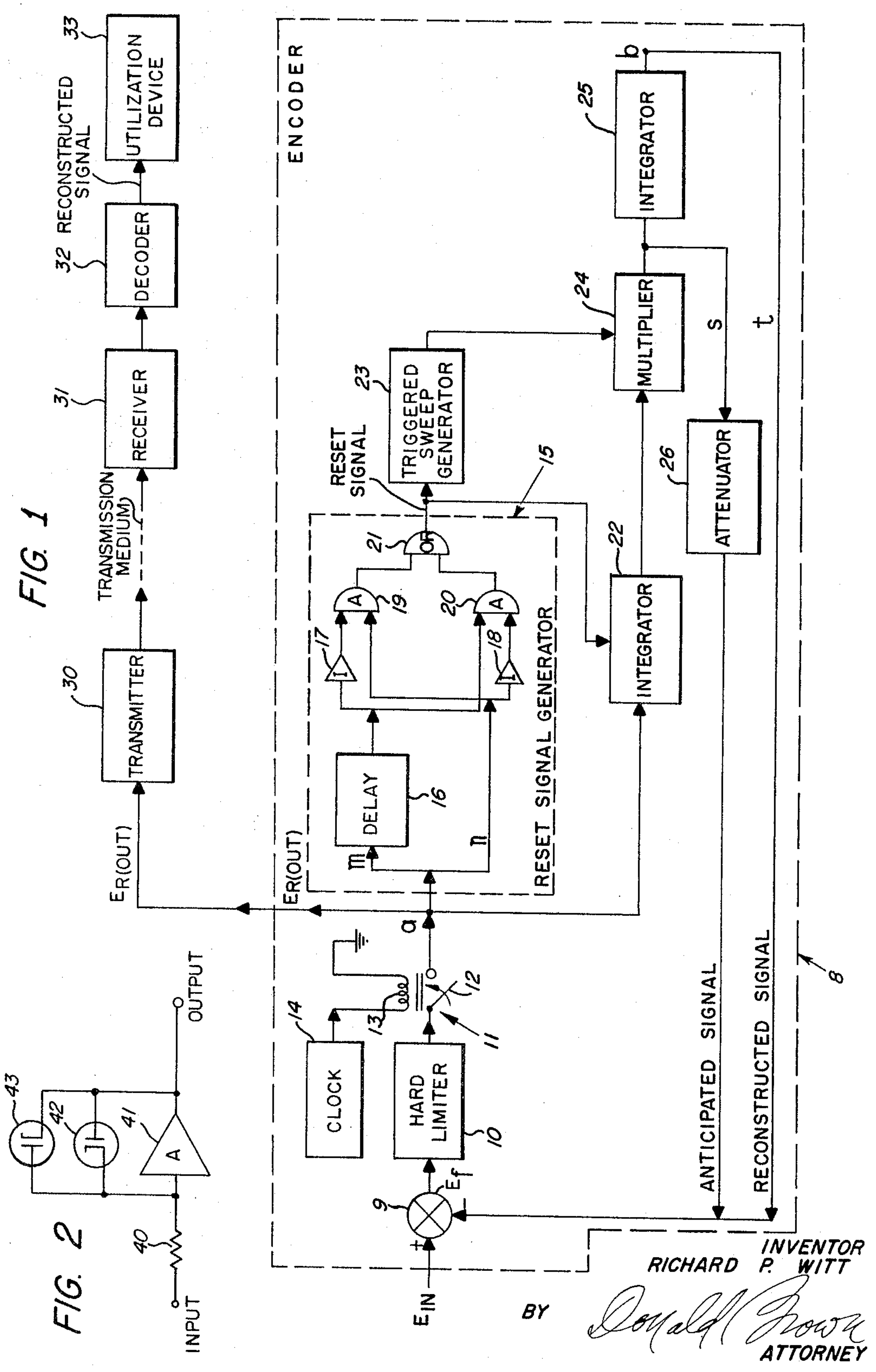

This invention relates to encoding techniques and, more particularly, to techniques for generating signals representative of an analog input signal.

This invention further relates to an input signal sampled coding technique which utilizes a double integration series amplification feedback technique to generate an anticipation signal to reduce overshoot in a signal reconstructed from a coded signal representing the input signal.

It is the principal object of this invention to provide an improved encoding system for converting an input signal into coded form.

It is another object of this invention to provide an encoder which operates in a manner so as to minimize overshoot in a reconstructed input signal.

It is an additional object of this invention to provide an encoder which successively samples an analog signal and compares this analog signal with a signal which is the sum of the reconstructed input signal at or just prior to the time of the next sample and an anticipation signal which is related to a next expected amplitude of the reconstructed signal.

It is yet another object to provide an encoder which furnishes a code of pulses wherein successive similar pulses are related to a power series or other ascending or descending function or combination thereof.

In accordance with this invention, means for encoding an analog signal comprises means for making a comparison between an input analog signal and the sum of the reconstructed input signal at or just prior to the time of sampling for the next comparison measurement and an anticipation signal which is a function of a next expected increment in the reconstructed signal.

In particular, a difference signal is obtained by taking the difference between an analog input signal and the sum of an anticipation signal which is generated by multiplying a signal representing a power series or other function and a signal whose amplitude is dependent upon the duration such difference has existed and a reconstructed signal which is generated in the same manner as the anticipation signal, but with the addition of a further integration step in order to provide a reconstructed signal in accordance with the input signal.

Other objects and advantages will become apparent in the following detailed description taken in conjunction with the appended drawings in which:

FIG. 1 is a block diagram of the encoder of this invention in combination with a transmission, receiving, decoding system; and FIG. 2 is a schematic diagram of a hard limiter suitable for use in FIG. 1.

Referring now to FIG. 1, there is shown a block diagram of the encoder 8 of this invention. The encoder 8 comprises a comparator 9 for taking the difference between an analog input signal $E_{in}$ and a feedback signal $E_f$ which is generated in a manner to be described. Feedback signal $E_f$ is equal to the summation of the input signal as reconstructed at or just prior to the taking of the next difference sample and an anticipation signal which is related to a next expected value or magnitude of the reconstructed signal. The comparator 9 functions in a manner so as to provide the subtraction of $E_{in}-E_f$. After $E_f$ has been subtracted from $E_{in}$, the resultant difference signal is transmitted to a hard limiter 10. The hard limiter 10 is a high gain amplifier which provides substantially a positive maximum value or a negative maximum value for all positive difference signals and all negative difference signals, respectively.

FIG. 2 shows a schematic of a structure which is suitable for use as a hard limiter. It comprises the combination of resistance 40 and an operational amplifier 41. Coupled across the operational amplifier 41 are two clamping diodes 42 and 43. Upon the application of a small positive signal, the operational amplifier, due to its high gain, will produce a rapidly ascending waveform. At a predetermined time, one of the diodes will turn on and clamp or limit the output voltage to a predetermined level. In this manner, a series of successive positive or negative going constant amplitude output signals, representing the difference signal, is obtained from the limiter 10.

In order to sample the difference signal as altered by the hard limiter 10, a switch 11 comprising a relay arm 12 and a relay coil 13 is provided. It is to be understood that a completely electronic switch, such as diodes could be utilized in high speed applications. A clock 14, which provides pulses to control the movement of the arm 12 in a predetermined manner, is shown coupled to the coil 13 of the switch 11. Upon closure of the switch 11, a sampled output signal or error signal $E_r$ is obtained. $E_r$ is a coded representation of the difference between $E_{in}$ and $E_f$ as altered by the hard limiter 10.

This signal $E_r$ may then be transmitted by a suitable transmission or transmitter device 30, such as a pulse code modulation transmitter. The pulse code modulation representative of this $E_r$ or error signal is then transmitted through a suitable transmission media, such as by way of long lines or through the air waves to a receiving site spaced at a distance from the transmitting station. This error signal can then be detected by a receiver 31 and reconstructed by a decoder 32 to provide a signal representative of the analog input signal to a utilization device 33, such as a monitor or display. The technique and apparatus for generating this reconstructed signal at a remote receiving site will be described in conjunction with the apparatus which provides the reconstructed signal portion of the feedback signal $E_f$ which is shown between points *a* and *b* of FIG. 1.

The error signal is simultaneously operated on by the following structures to be described in order to generate a signal which is reconstructed so as to represent the input signal $E_{in}$ and is further operated on to produce a signal labeled as an anticipation signal which is a function of a next expected increment of magnitude of the reconstructed signal. The signal $E_r$, which appears at point *a*, is also applied simultaneously to a reset signal generator 15.

The reset signal generator 15 is utilized to provide an output signal whenever the error signal $E_r$ exhibits a change in sign or polarity from that which was obtained on the previous comparison. To obtain the reset signal, the error signal is applied simultaneously by way of lines *m* and *n* to the structure to be described herein. The error signal on line *m* is delayed by a delay line 16 for a period equal to the time between clock pulses. Thus, two error signals, that is, the error signal on line *n*, which represents the latest sample, and error signal from the delay line 16, which represents the previous sample, is obtained. These two error signals are then compared utilizing an inverter 17, an "and" circuit 19 and an inverter 18 and an "and" circuit 20, both coupled to an "or" circuit 21. An output will be obtained from "and" circuit 19 if both signals applied to it are positive, and an output signal will be obtained from "and" circuit 20 if both lines coupled to it are positive. These events will occur if the previous error signal is positive and the latest error signal is negative or vice versa. An output will be obtained from "and" circuit 19 if the previous error signal was negative and the present or latest error signal is positive and an output will be obtained from "and" circuit 20 if the previous error signal was positive and the latest error signal is negative. An output or reset signal will be obtained from "or" circuit 21 when either "and" circuit 19 or 20 provides an output signal. In this manner, a reset signal is provided whenever there is a change in sign between the last or previous error signal and the present or most recent error signal. At the same time that this reset signal is being generated, the error signal $E_r$ is simultaneously applied to an integrator 22.

The integrator 22, assuming that it has been reset, will start from zero voltage and will count the number of successive pulses or samples. The integrator 22 will continue to count the number of successive pulses until a reset signal from the signal generator 15 resets it, once again, to a zero voltage position. The integrator output provides a voltage signal to a multiplier 24. This signal is then multiplied in multiplier 24 with an output signal provided from a function or sweep generator 23. A typical multiplier, such as "Hall" effect multiplier, could be utilized.

The output signal provided by sweep generator 23 may be of a linear sawtooth, triangular or logarithmic waveform or other waveforms representing various power series or stairstep-like functions. Further, the step-like function may represent binary steps, such as 1, 2, 4, 8, etc. or 1, 2, 3, 4, 5 6. In the preferred embodiment shown in FIG. 1 the sweep generator 23 will be presumed to provide a triangular output waveform which ascends from a zero voltage level to some positive level. A sweep generator, such as a phantastron, could be utilized.

The sweep generator 23 is set simultaneously by the reset signal provided by generator 15. That is, upon the recognition of a change in sign, the reset generator 15 will provide an output signal which will simultaneously reset integrator 22 and sweep generator 23. Thus, the multiplier 24 will continuously take the product of the output from integrator 22 and the voltage output signal from sweep generator 23.

This output signal from multiplier 24 will be a steep rising output signal inasmuch as the successive duration of pulses prior to a change in sign being detected by the reset signal generator will permit the output signal from integrator 22 to be multiplied by a rapidly ascending triangular voltage signal. In this manner, the input signal $E_{in}$ can be rapidly tracked and its peak value reached within a relatively short period of time.

The output from multiplier 24 is then fed into an integrator 25 which operates to reproduce and reconstruct the input signal $E_{in}$. This is noted as the reconstructed signal on the line *t* from the output from integrator 25. Simultaneously, this output signal from multiplier 24 is applied by line *s* to an attentuator 26, such as a voltage divider. Attenuator 26 controls the magnitude of the anticipation signal. Attenuator 26 can be adjusted either manually or electrically to set the magnitude of the anticipation signal to predetermined amounts of the output signal from multiplier 24, thus, providing a variable magnitude anticipation signal. These two signals, that is, the reconstructed signal and the anticipation signal are then summed to obtain and continuously alter the feedback signal $E_f$ which is then applied to the comparator 9.

Thus, an encoder has been provided which not only rapidly tracks an input waveform but simultaneously prevents excessive overshoot of the maximum value of the reconstructed waveform by anticipating the next expected increase in the reconstructed analog signal.

Although the structure of FIG. 1 is not shown as having a synchronized clock, this structure could be synchronized and timed with the clock pulses of clock 14. Furthermore, if a completely digital system were desired instead of the hybrid analog and digital system disclosed in FIG. 1, digital logic and circuitry could be substituted for the integrator 22, the generator 23, the multiplier 24, and the integrator 25. If these substitutions are made, digital to analog converters are coupled to lines *s* and *t* in order to provide the analog signals required to be generated in order to obtain the feedback signal $E_f$.

The sampled data system disclosed herein is particularly useful in applications requiring rapid tracking of an analog signal voltage or input waveform. For example, the structure disclosed herein is suitable for utilization in digital television, speech encoding, and mechanical shaft follower servo applications.

Since many changes could be made in the above described construction and many apparently widely different embodiments of the present invention could be made without departing from the scope thereof, it is maintained that all matter contained in the above descirption or shown in the accompanying drawings should be interpreted as illustrative and not in a limiting sense.

What is claimed is:

1. A system comprising means for comparing an input signal with a feedback signal to provide a coded output signal, and means responsive to said output signal for altering said feedback signal, said last means comprising means for providing a reconstructed input signal from said coded output signal and for adding to said reconstructed input signal a signal related to the expected changes in magnitude of said reconstructed signal which would result from taking of the next sample.

2. In combination, means for deriving a difference signal between successive samples of an analog input signal and an analog feed back signal, and means for altering said feedback signal comprising means for reconstructing said input signal from said difference signal and means for adding to said reconstructed input signal a signal related to the change in the expected value of said reconstructed signal which would result from taking of the next sample.

3. A data system comprising means for successively generating a difference signal representing the difference between an input signal and a feedback signal, means for providing a first signal in accordance with an integration of signals representing said successive difference signals, means for generating a second signal, means for taking the product of said first and second signals, means for resetting said means for providing a first signal and said means for providing a second signal upon the recognition of a change in sign of said difference signal, means for integrating said product of said first and second signals, and means for altering said feedback signal, said means for altering comprising means for summing the output from the integration of said product and an anticipation signal representative of said product signal multiplied by a factor.

4. A system in accordance with claim 3 including means for transmitting said difference signal, means for receiving said transmitted difference signal, and means for decoding said received difference signal to provide a reconstructed input signal, said last means comprising means for counting said difference signal, means for providing a third signal, means for taking the product of said third signal and said counted difference signal, means for resetting said means for counting and said means for providing said third signal upon the recognition of a change of sign of said difference signal, and means for integrating said product of said third signal and said counted difference signal.

5. A sampled data system comprising means for comparing an input signal with a feedback signal to provide a coded output signal, means responsive to said output signal for altering said feedback signal, said last means comprising means for providing a reconstructed input signal from said coded output signal and for adding to said reconstructed input signal a signal related to the expected changes in magnitude of said reconstructed signal which would result from taking of the next sample, means for transmitting said coded output signal, means for receiving said coded output signal, and means for decoding said output signal to provide a reconstructed input signal.

6. In combination, means for deriving a difference signal between successive samples of an analog input signal and an analog feedback signal, means for altering said feedback signal comprising means for reconstructing said input signal from said difference signal, means for adding to said reconstructed input signal a signal related to the change in the expected value of said reconstructed signal which would result from the taking of the next sample, and means for decoding said difference signal comprising means for reconstructing said input signal from said difference signal.

7. An encoder for generating a coded output signal comprising means for comparing an analog input signal with a feedback signal, means for converting the result of the comparison of said analog input signal and said analog feedback signal into a series of output pulses, means for counting said pulses, means for providing a first signal which varies in a predetermined manner, means for multiplying said first signal and said count of said pulses to provide a second signal, means for resetting said counter and means for providing said first signal upon the recognition of a change in sense of said pulses, means for counting said second signal to provide a reconstructed input signal, means for attenuating said second signal in a predetermined manner to provide an anticipation signal, and means for summing said reconstructed signal and said anticipation signal to alter said feedback signal.

8. A system comprising means for comparing an input signal with a first signal to provide a difference signal, and means for varying said first signal with a signal which is the sum of an anticipation signal generated by multiplying a signal representing a function and a signal whose amplitude is dependent upon the duration of said difference signal and a reconstructed signal which is generated in the same manner as said anticipation signal with the addition of a further integration step.

References Cited by the Examiner

UNITED STATES PATENTS

| | | | |
|---|---|---|---|
| 3,065,422 | 11/1962 | Villars | 325—141 |
| 3,068,463 | 12/1962 | Goldman | 340—347 |

MAYNARD R. WILBUR, *Primary Examiner.*

A. L. NEWMAN, *Assistant Examiner.*